United States Patent
Brennan et al.

(10) Patent No.: US 9,416,225 B2
(45) Date of Patent: Aug. 16, 2016

(54) HYDROLYSIS RESISTANT POLYESTER FILMS

(75) Inventors: William J. Brennan, Middlesbrough (GB); Simon V. Mortlock, Dumfries (GB); Allan Lovatt, Middlesbrough (GB); David Phillips, Cleveland (GB); David R. Turner, Newcastle-Upon-Tyne (GB)

(73) Assignee: DUPONT TEIJIN FILMS U.S. LIMITED PARTNERSHIP, Chester, VA (US)

( * ) Notice: Subject to any disclaimer, the term of this patent is extended or adjusted under 35 U.S.C. 154(b) by 0 days.

(21) Appl. No.: 13/394,623

(22) PCT Filed: Sep. 8, 2010

(86) PCT No.: PCT/GB2010/001698
§ 371 (c)(1),
(2), (4) Date: May 31, 2012

(87) PCT Pub. No.: WO2011/030098
PCT Pub. Date: Mar. 17, 2011

(65) Prior Publication Data
US 2012/0227801 A1  Sep. 13, 2012

(30) Foreign Application Priority Data
Sep. 8, 2009  (GB) .................................. 0915687.8

(51) Int. Cl.
| | | |
|---|---|---|
| *C08K 5/1515* | (2006.01) | |
| *H01L 31/0216* | (2014.01) | |
| *B29C 47/00* | (2006.01) | |
| *C08G 63/91* | (2006.01) | |
| *C08J 5/18* | (2006.01) | |

(52) U.S. Cl.
CPC ............... *C08G 63/916* (2013.01); *C08J 5/18* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 3,244,708 | A | 4/1966 | Duennenberger et al. |
| 3,372,143 | A | 3/1968 | Terada et al. |
| 3,657,191 | A | 4/1972 | Titzmann et al. |
| 3,843,371 | A | 10/1974 | Piller et al. |

(Continued)

FOREIGN PATENT DOCUMENTS

| | | |
|---|---|---|
| CA | 2514589 | 8/2004 |
| CN | 101412591 | 4/2009 |

(Continued)

OTHER PUBLICATIONS

Tanaka, "Synthesis and Characterization of Epoxides," Epoxy Resins Chemistry and Technology, May and Dekker (eds.), 1988.*
Kent, "Plastics Profile Extrusion," Rapra Review Reports, vol. 9, No. 8 (1998), p. 10.*
Lohner, Pierre, International Search Report for International Application No. PCT/GB2010/001698, dated Nov. 16, 2010.

(Continued)

*Primary Examiner* — Ling Choi
*Assistant Examiner* — Catherine S Branch
(74) *Attorney, Agent, or Firm* — RatnerPrestia

(57) ABSTRACT

A biaxially oriented polyester film including polyethylene terephthalate (PET) and at least one hydrolysis stabilizer selected from a glycidyl ester of a branched monocarboxylic acid, wherein the monocarboxylic acid has from 5 to 50 carbon atoms, wherein the hydrolysis stabilizer is present in the film in the form of its reaction product with at least some of the end-groups of the polyester; a process for making the same; and use of the film as a layer in a photovoltaic cell.

22 Claims, 1 Drawing Sheet

(56) References Cited

U.S. PATENT DOCUMENTS

| | | | |
|---|---|---|---|
| 3,869,427 | A | 3/1975 | Meschke et al. |
| 4,115,350 | A | 9/1978 | Lazarus et al. |
| 4,130,541 | A | 12/1978 | Lazarus et al. |
| 4,152,318 | A | 5/1979 | Lazarus et al. |
| 4,446,262 | A | 5/1984 | Okumura et al. |
| 4,540,729 | A | 9/1985 | Williams |
| 4,578,295 | A | 3/1986 | Jabarin |
| 4,619,956 | A | 10/1986 | Susi |
| 4,681,905 | A | 7/1987 | Kubota et al. |
| 4,684,679 | A | 8/1987 | Kubota et al. |
| 4,812,498 | A | 3/1989 | Nakahara et al. |
| 5,251,064 | A | 10/1993 | Tennant et al. |
| 5,264,539 | A | 11/1993 | Shepherd |
| 5,288,778 | A | 2/1994 | Schmitter et al. |
| 5,589,126 | A | 12/1996 | Shih et al. |
| 5,763,538 | A | 6/1998 | Hunter |
| 5,885,709 | A | 3/1999 | Wick et al. |
| 6,051,164 | A | 4/2000 | Samuels |
| 6,121,389 | A | 9/2000 | Kooijmans et al. |
| 6,224,016 | B1 | 5/2001 | Lee |
| 6,274,805 | B1 | 8/2001 | Nakazawa |
| 6,388,024 | B1 | 5/2002 | Van Gaalen |
| 6,441,298 | B1 | 8/2002 | Thio |
| 6,498,212 | B1 | 12/2002 | Kao et al. |
| 6,503,616 | B1 | 1/2003 | Jalan |
| 6,709,731 | B2 | 3/2004 | Murschall |
| 6,730,406 | B2 | 5/2004 | Murschall |
| 6,838,529 | B2 | 1/2005 | Kumazawa |
| 6,881,470 | B2 | 4/2005 | Murschall |
| 7,229,697 | B2 | 6/2007 | Kliesch et al. |
| 7,241,507 | B2 | 7/2007 | Kliesch et al. |
| 7,375,167 | B2 | 5/2008 | Natarajan |
| 7,534,487 | B2 | 5/2009 | Klein |
| 2001/0017429 | A1 | 8/2001 | Takahashi |
| 2001/0029274 | A1 | 10/2001 | Murschall et al. |
| 2002/0065346 | A1 | 5/2002 | Murschall et al. |
| 2002/0099150 | A1* | 7/2002 | Kumazawa et al. .......... 525/438 |
| 2003/0068511 | A1 | 4/2003 | Murschall et al. |
| 2003/0219614 | A1 | 11/2003 | Kliesch et al. |
| 2004/0121803 | A1 | 6/2004 | Weinblatt |
| 2005/0137299 | A1 | 6/2005 | Berndt |
| 2005/0222345 | A1 | 10/2005 | Nakayama |
| 2006/0057408 | A1 | 3/2006 | Kliesch et al. |
| 2006/0057409 | A1 | 3/2006 | Kliesch et al. |
| 2006/0057490 | A1 | 3/2006 | Joo et al. |
| 2006/0263592 | A1 | 11/2006 | Kusume et al. |
| 2006/0275593 | A1 | 12/2006 | Kern et al. |
| 2007/0065649 | A1 | 3/2007 | Matsui |
| 2007/0237972 | A1 | 10/2007 | Kliesch et al. |
| 2007/0238816 | A1 | 10/2007 | Kliesch et al. |
| 2007/0240075 | A1 | 10/2007 | Jesberger et al. |
| 2008/0132631 | A1 | 6/2008 | Natarajan |
| 2008/0264484 | A1 | 10/2008 | Temchenko |
| 2008/0289680 | A1* | 11/2008 | MacFarlane .................. 136/246 |
| 2008/0302408 | A1 | 12/2008 | Bressler |
| 2009/0034235 | A1 | 2/2009 | Kusume et al. |
| 2009/0078314 | A1 | 3/2009 | Temchenko |
| 2009/0101204 | A1 | 4/2009 | Levy |
| 2009/0139564 | A1 | 6/2009 | Miyaji |
| 2009/0162589 | A1 | 6/2009 | Buchanan |
| 2009/0211621 | A1 | 8/2009 | LeBlanc |
| 2009/0275678 | A1 | 11/2009 | Kumazawa |
| 2010/0002402 | A1 | 1/2010 | Rogers |
| 2010/0071757 | A1 | 3/2010 | Krajewski |
| 2010/0120946 | A1* | 5/2010 | Kliesch et al. ................ 523/400 |
| 2010/0215902 | A1 | 8/2010 | Kiehne |
| 2010/0229923 | A1 | 9/2010 | Frolov |
| 2010/0229924 | A1 | 9/2010 | Teranishi |
| 2010/0233843 | A1 | 9/2010 | Frolov |
| 2010/0243029 | A1 | 9/2010 | Higashi |
| 2010/0258162 | A1 | 10/2010 | OBrien |
| 2010/0288353 | A1 | 11/2010 | Kliesch |
| 2010/0307570 | A1 | 12/2010 | Aoyama |
| 2010/0326517 | A1 | 12/2010 | OBrien |
| 2012/0227801 | A1 | 9/2012 | Brennan |

FOREIGN PATENT DOCUMENTS

| | | | |
|---|---|---|---|
| EP | 0 006 686 | | 1/1980 |
| EP | 0 031 202 | | 7/1981 |
| EP | 0 031 203 | | 7/1981 |
| EP | 0 076 582 | | 4/1983 |
| EP | 0 292 251 | | 11/1988 |
| EP | 0 620 245 | | 10/1994 |
| EP | 0 738 749 | | 10/1996 |
| EP | 0 838 500 | | 4/1998 |
| EP | 1 209 200 | | 5/2002 |
| EP | 1 826 826 | | 8/2007 |
| EP | 1 898 470 | A1 | 3/2008 |
| EP | 2 184 312 | | 5/2010 |
| EP | 2184311 | | 5/2010 |
| EP | 2 262 000 | A1 | 12/2010 |
| EP | 2 415 599 | A1 | 2/2012 |
| EP | 2 476 552 | A1 | 7/2012 |
| EP | 2 495 284 | A1 | 9/2012 |
| GB | 1048068 | | 10/1965 |
| GB | 0620245 | A1 * 10/1994 | ............... B29D 7/01 |
| JP | 53147018 | | 12/1978 |
| JP | 10130482 | | 5/1998 |
| JP | 2000007847 | | 1/2000 |
| JP | 2000302114 | | 10/2000 |
| JP | 2004165513 | | 6/2004 |
| JP | 2005325214 | | 11/2005 |
| JP | 2005325216 | | 11/2005 |
| JP | 200649541 | | 2/2006 |
| JP | 2007208179 | | 8/2007 |
| JP | 2009155412 | | 7/2009 |
| JP | 2009155478 | | 7/2009 |
| JP | 2009188105 | | 8/2009 |
| JP | 4501042 | B2 | 7/2010 |
| NL | 6814541 | | 10/1969 |
| SU | 192098 | | 1/1967 |
| SU | 307091 | | 1/1971 |
| WO | WO 94/05645 | | 3/1994 |
| WO | WO 99/51659 | | 10/1999 |
| WO | WO 00/04073 | | 1/2000 |
| WO | WO 01/56966 | | 8/2001 |
| WO | 2008001790 | | 1/2008 |
| WO | WO 2008001790 | A1 * | 1/2008 |
| WO | 2009069742 | | 6/2009 |

OTHER PUBLICATIONS

Cardura E10P Product Bulletin, 4 pgs., 2006.

Momentiv, Technical Data Sheet, Cardura E10P Product Bulletin, Nov. 2012, 3 pages.

Resolution Performance Products, Product Data Sheet, Versatic 10, May 2002, 3 pages.

Entire patent prosecution history of U.S. Appl. No. 14/003,676, filed Nov. 15, 2013, entitled, "Hydrolysis Resistant Polyester Films.".

Masson, Patrick, International Preliminary Report on Patentability dated Jun. 5, 2013, for International Application No. PCT/GB2012/000224, 5 pages.

Masson, Patrick, International Search Report dated May 11, 2012, for International Application No. PCT/GB2012/000224, 4 pages.

U.S. Office Action mailed Jul. 7, 2014 in U.S. Appl. No. 14/003,676.

Japanese Office Action in related Japanese Application No. JP2012-528444 dated Oct. 6, 2014.

Office Action in U.S. Appl. No. 14/003,676, mailed Oct. 29, 2014.

Russian Office Action mailed Jun. 30, 2014 in counterpart Russian Application No. 2012113737, including translation.

Translation of Russian Decision on Grant of Patent for Invention in Russian Application No. 2012113737/04(020746) issued Nov. 6, 2014.

Advisory Action mailed Jul. 2, 2015 for U.S. App. No. 14/003,676.

Final Office Action mailed Apr. 28, 2015 for U.S. Appl. No. 14/003,676.

Notice of Allowance dated Jan. 20, 2016 for U.S. Appl. No. 14/003,676.

* cited by examiner

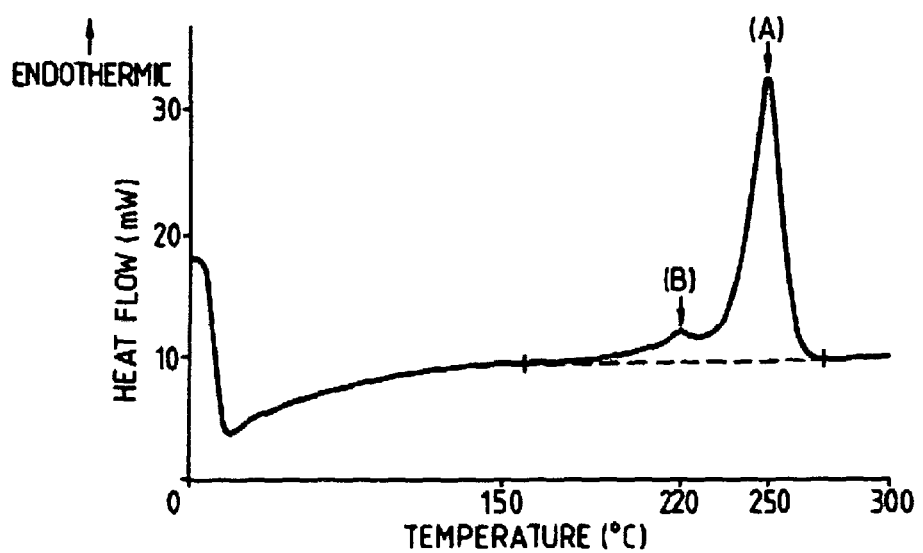

HYDROLYSIS RESISTANT POLYESTER FILMS

CROSS REFERENCE TO RELATED APPLICATIONS

This application is a National Phase filing of International Application No. PCT/GB2010/001698, filed 8 Sep. 2010, and claims priority of GB Application No. 0915687.8, filed 8 Sep. 2009, the entireties of which applications are incorporated herein by reference.

FIELD OF THE INVENTION

The present invention is concerned with a polyethylene terephthalate (PET) films which exhibit improved hydrolysis resistance, and with a process for the production thereof.

BACKGROUND OF THE INVENTION

The advantageous mechanical properties, dimensional stability and optical properties of polyester films are well-known. However, polyester films are susceptible to hydrolytic degradation, which results in a reduction in the intrinsic viscosity of the polymer, and a consequent deterioration in one or more of the afore-mentioned desirable properties of the film, particularly the mechanical properties. Poor hydrolysis resistance is a particular problem when the film is used under humid conditions and/or elevated temperatures and/or in exterior applications, such as in photovoltaic (PV) cells.

In order to improve the hydrolysis resistance of polyester films, it is known to incorporate hydrolysis stabilisers into the film. For instance, the addition of carbodiimides as end-capping agents in polyester compositions was proposed in U.S. Pat. No. 5,885,709 and EP-0838500, amongst others, but such additives have a tendency to emit harmful gaseous by-products. US-2003/0219614-A1 reports that the use of polymeric carbodiimides as the hydrolysis stabilisers reduces the tendency for gas evolution. US-2002/0065346-A1 teaches hydrolysis stabilisers selected from a phenolic compound, an oxazoline and/or a monomeric or polymeric carbodiimide, optionally combined with an organic phosphite. GB-1048068 teaches the use of copper salts of organic carboxylic acids as hydrolysis stabilisers. U.S. Pat. No. 3,657,191 and U.S. Pat. No. 3,869,427 teach the modification of the terminal groups of the polyester by reaction with ethylene carbonates or monofunctional glycidyl ethers. Hydrolysis-resistant polyesters stabilised by the use of terminal epoxy group-containing compounds are also disclosed in EP-0292251-A. In EP-1209200 it is reported that a combination of a glycidyl ester and a glycidyl ether in the presence of a catalyst which promotes reaction between glycidyl and carboxyl groups improves the hydrolysis resistance of polyesters, although that disclosure is directed to polybutylene terephthalate (PBT), which crystallises much faster than PET, and its use in the manufacture of injection-moulded materials. U.S. Pat. No. 6,498,212 discloses polyesters in which hydrolytic stability has been improved by the use of a polymeric end-capping agent selected from epoxyethylene-ethyl acrylate copolymers, epoxystyrene-butadiene-styrene block copolymers and aminopolyethylene copolymers. The use of epoxidised fatty acid alkyl esters (such as epoxidised stearic acid 2-ethyl-hexyl ester) and/or epoxidised fatty acid glycerides (such as epoxidised soybean or linseed oil) as hydrolysis stabilisers in polyester compositions is disclosed in CA-2514589-A, U.S. Pat. No. 4,540,729, U.S. Pat. No. 5,589,126, U.S. Pat. No. 7,229,697, U.S. Pat. No. 7,241,507, US-2005/0137299-A1, US-2007/0238816-A1 and US-2007/0237972-A1. Other methods of improving hydrolytic stability of polyethylene terephthalate (PET) films include the simultaneous control of parameters such as intrinsic viscosity, diethylene glycol content and crystallinity, as disclosed in EP-0738749-A. The control of intrinsic viscosity and crystallinity, in combination with the presence of an antioxidant, is reported in EP-0620245-A as improving high-temperature (180° C.) ageing characteristics without detriment to in-plane delamination properties for polyester films used as insulator materials in electric motors and capacitors. U.S. Pat. No. 4,115,350 and U.S. Pat. No. 4,130,541 teach that the reaction product of polyesters with epoxidised alkyl esters of monocarboxylic acids, amides and thio-acids improves the thermal stability of the polyester in fibres and cords made therefrom. U.S. Pat. No. 3,372,143 teaches that the reaction product of polyesters with epoxidised alkoxy- or aryloxy-ethers improves the dyeability of fibres made therefrom.

One of the problems associated with the incorporation of hydrolysis stabilisers into polyester films is that while increasing the concentration of the additive improves the hydrolysis resistance, it does so at the expense of a reduction in the melting point and a deterioration in the mechanical properties of the polyester film. One of the consequences of a reduction in mechanical properties is that the processability of the filmed polyester becomes poor, and breakage of the film web occurs during manufacture and subsequent processing.

Another problem with the use in the prior art polyester films of hydrolysis stabilisers based on epoxidised fatty acids, particularly epoxidised fatty acid glycerides, is that such additives have a tendency to decompose during film manufacturing and processing with evolution of acrolein, a highly toxic, flammable and foul-smelling substance.

An additional problem with the known hydrolysis stabilisers, particularly those based on certain epoxidised fatty acid glycerides and multi-functional glycidyl compounds, is the reduction of film quality and processability when such additives are incorporated into the film in an amount effective to provide improved hydrolysis resistance. In particular, such additives induce profile defects and unacceptable levels of die-lines in polyester films, i.e. poor uniformity in thickness and/or light transmission across the film web, and the extrudate can become impossible to process on a film-line because of breakage of the film web. It is believed that such problems are at least partly attributable to cross-linking and gel formation, which interferes with the stretching process experienced by the film during its manufacture. A further problem with using multi-functional glycidyl compounds as hydrolysis stabilisers for PET is that their higher rate of chain extension of the polyester increases melt viscosity, which in turn reduces the extrusion output at a given temperature, and this is economically undesirable. While viscosity could theoretically then be reduced by increasing melt temperatures, this would lead to increased rates of degradation of the polymer and hydrolysis stabiliser and cause gel formation. Gel formation is much less problematic in the manufacture of other polyester products, such as injection moulded PBT products, in part because of the much greater thickness of those products compared to polyester film.

SUMMARY OF THE INVENTION

It is an object of this invention to provide alternative hydrolysis resistant polyester films, particularly wherein the hydrolysis resistance is improved, particularly wherein the film may be manufactured and used without the evolution of toxic by-products, particularly while maintaining or improving the ease and efficiency and economy of film manufacture without increasing film breakage, particularly wherein the level of die-lines and profile defects is reduced, and particularly without detriment to the mechanical and/or optical properties of the film.

According to the present invention, there is provided a biaxially oriented polyester film comprising polyethylene terephthalate and at least one hydrolysis stabiliser selected from a glycidyl ester of a branched monocarboxylic acid, wherein the monocarboxylic acid has from 5 to 50 carbon atoms, and wherein said hydrolysis stabiliser is present in the film in the form of its reaction product with at least some of the end-groups of said polyester.

BRIEF DESCRIPTION OF THE DRAWING

FIG. 1 shows a typical DSC scan (heat flow versus temperature) obtained for a polyester film according to the invention.

DETAILED DESCRIPTION OF THE INVENTION

The hydrolysis stabiliser used in the present invention acts as an end-group capper for the polyester by reacting with the carboxyl end-groups and/or the hydroxyl end-groups of the polyester, and it is believed that the predominant reaction is with the carboxyl end-groups. Carboxyl end-groups have been demonstrated to be primarily responsible for the hydrolytic degradation of polyesters, including polyethylene terephthalate. The glycidyl group of the hydrolysis stabiliser reacts rapidly with the end-groups of the polyester at elevated temperatures and, importantly, does so with zero elimination of toxic by-products during manufacture of the modified polyester or during subsequent manufacture and use of the polyester film. The hydrolysis stabiliser is readily well incorporated into the polyester.

The polyester film is a self-supporting film or sheet by which is meant a film or sheet capable of independent existence in the absence of a supporting base.

The polyester of said polyester film is polyethylene terephthalate but it may also contain relatively minor amounts of one or more residues derived from other dicarboxylic acids and/or diols. Other dicarboxylic acids include isophathalic acid, phthalic acid, 1,4-, 2,5-, 2,6- or 2,7-naphthalenedicarboxylic acid, 4,4'-diphenyldicarboxylic acid, hexahydro-terephthalic acid, 1,10-decanedicarboxylic acid and aliphatic dicarboxylic acids of the general formula $C_nH_{2n}(COOH)_2$ wherein n is 2 to 8, such as succinic acid, glutaric acid sebacic acid, adipic acid, azelaic acid, suberic acid or pimelic acid. Other diols include aliphatic and cycloaliphatic glycols, such as 1,4-cyclohexanedimethanol. Preferably the polyester film contains only one dicarboxylic acid, i.e. terephthalic acid. Preferably the polyester contains only one glycol, i.e. ethylene glycol. The polyester resin is the major component of the film, and makes up at least 50%, preferably at least 65%, preferably at least 80%, preferably at least 90%, and preferably at least 95% by weight of the total weight of the film.

The intrinsic viscosity of the polyester from which the film is manufactured is preferably at least about 0.65, preferably at least about 0.70 and preferably at least about 0.80.

Formation of the polyester is conveniently effected in a known manner by condensation or ester interchange, generally at temperatures up to about 295° C. In a preferred embodiment, solid state polymerisation may be used to increase the intrinsic viscosity to the desired value, using conventional techniques well-known in the art, for instance using a fluidised bed such as a nitrogen fluidised bed or a vacuum fluidised bed using a rotary vacuum drier.

The hydrolysis stabiliser is preferably present in an amount in the range from about 0.1% to about 5%, more preferably from about 0.1% to about 2.5%, more preferably from about 0.1% to about 2.0%, more preferably from about 0.3% to about 1.75%, more preferably from about 0.3% to about 1.5%, relative to the total weight of the film.

The branched monocarboxylic acid from which the hydrolysis stabiliser is derived has from 5 to 50 carbon atoms, preferably from 5 to 25 carbon atoms, preferably from 5 to 15 carbon atoms, preferably from 8 to 12 carbon atoms, preferably from 9 to 11 carbon atoms, and in one embodiment has 10 carbon atoms. The monocarboxylic acid is preferably saturated, i.e. the carbon-carbon bonds in the molecule are single bonds. The branched monocarboxylic acid is preferably one in which the carbon atom adjacent the carboxylic acid group (hereinafter referred to as the "α-carbon" atom) is a tertiary carbon atom, i.e. it is attached via three carbon-carbon single bonds to three carbon atoms other than the carbon atom of the carboxylic acid group, and each of said three carbon atoms may be part of an alkylene group or an alkyl group. The monocarboxylic acid is preferably a synthetic material, i.e. it is manufactured via organic synthesis comprising at least one synthetic step according to conventional procedures (see for instance WO-01/56966-A1), rather than a naturally occurring material (such as a fatty acid) which by require isolation from a naturally occurring substance.

The hydrolysis stabiliser used in the present invention may be manufactured by the known reaction of epichlorohydrin with the desired branched monocarboxylic acid. The reaction may be conducted using conventional acidic or basic catalysts, such as alkali metal carboxylates and quaternary ammonium halides, typically at elevated temperatures (temperatures in the range of 50 to 120° C. are typical).

In one embodiment, a single hydrolysis stabiliser is used in the polyester film, but in a preferred embodiment a mixture of hydrolysis stabilisers as defined herein may be used, in which case the total concentration of hydrolysis stabilisers is within the aforementioned ranges. The glycidyl ester(s) described herein is/are preferably used according to the invention in the absence of other hydrolysis stabilisers (i.e. in the absence of an hydrolysis stabiliser which is not a glycidyl ester of a branched monocarboxylic acid) and in one embodiment in the absence of glycidyl ether compound(s), particularly di- or poly-glycidyl ether compounds for the reasons given hereinabove. In one embodiment, the polyester film described herein consists essentially of polyethylene terephthalate and at least one hydrolysis stabiliser selected from a glycidyl ester of a branched monocarboxylic acid. In one embodiment of the present invention, the hydrolysis stabiliser(s) used in the present invention consist(s) essentially of at least one glycidyl ester of a branched monocarboxylic acid.

In one embodiment, the hydrolysis stabiliser has formula (I):

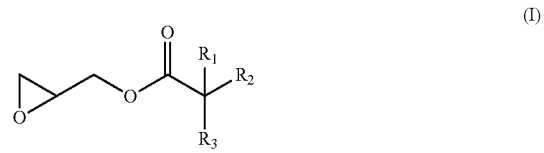

wherein:
  $R^1$ and $R^2$ are independently selected from alkyl, and preferably at least one (and in one embodiment only one) of $R^1$ and $R^2$ are selected from methyl;
  $R^3$ is selected from hydrogen and alkyl, and preferably from alkyl; and wherein the total number of carbon atoms in the alkyl groups $R^1$, $R^2$ and $R^3$ is from 3 to 48, preferably from 3 to 23, preferably from 3 to 13, preferably from 6 to 10, preferably from 7 to 9, and in one embodiment is 8.

In one embodiment, a mixture of hydrolysis stabilisers is used, each independently selected according to formula (I), and in one embodiment such that the total number of carbon atoms in the alkyl groups $R^1$, $R^2$ and $R^3$ in each component of the mixture is the same.

In a preferred embodiment, $R^1$ is selected from methyl, and $R^2$ and $R^3$ are independently selected from alkyl, wherein the total number of carbon atoms in the alkyl groups $R^2$ and $R^3$ is from 2 to 47, preferably from 2 to 22, preferably from 2 to 12, preferably from 5 to 9, preferably from 6 to 8, and in one embodiment is 7. In one embodiment, a mixture of these preferred hydrolysis stabilisers is used, preferably such that the total number of carbon atoms in the alkyl groups $R^1$, $R^2$ and $R^3$ in each component of the mixture is the same.

As used herein, the term "alkyl" preferably refers to an unsubstituted straight-chain acyclic hydrocarbon group of formula $[-C_nH_{2n+1}]$.

The hydrolysis stabiliser, for instance the compound of formula (I) above, may exhibit chirality, in which case the hydrolysis stabiliser may be present as either enantiomer or as a mixture of enantiomers.

In one embodiment, the hydrolysis stabiliser preferably has a viscosity of less than 100 mPa·s, preferably less than 50 mPa·s, preferably less than 25 mPa·s at 20° C., measured according to ASTM D445.

The hydrolysis stabiliser used in the present invention reacts with the polyester at elevated temperatures, typically between about 160° C. and 300° C., and does so with rapid reaction times, typically much less than 1 second at 290° C. The hydrolysis stabiliser can be introduced at various stages during the film making process, namely:

1. By adding the additive during manufacture of the polyester from its monomers, and this would normally be effected at the end of the polymerisation process immediately prior to extrusion into pellets. In one embodiment, the modified polyester may then be further treated by solid state polymerisation in order to increase the IV to a desired value.
2. By reacting the additive with the polyester chip off-line by melting the chip, mixing the melt with the additive, then re-extruding and pelletising the modified polyester into chips.
3. By adding the additive (typically wherein the additive is a liquid) to the polymer chip prior to or during the introduction of the polymer into the extruder used in the film-manufacturing process (for instance by adding the additive to the polymer in the hopper of the extruder), and then extruding this mixture allowing the additive and the polyester to react together in the extruder (typically a twin-screw extruder).
4. By injecting the additive (typically wherein the additive is a liquid) into the molten polymer resulting from the extrusion process (i.e. once the polymer is in the molten state within the extruder, typically a twin-screw extruder, and typically after the polymer has passed through any devolatilisation zone) but prior to the polymer being cast into a film.

In one embodiment, the hydrolysis stabiliser is introduced via one of routes (2), (3) and (4) above, preferably via route (4). In one embodiment, a masterbatch is produced by adding an excess amount of hydrolysis stabiliser, relative to the amount desired in the final film, and this is of particular utility for process route (2) above.

The inventors observed surprisingly improved product performance using process route (4), and in particular films manufactured by this route demonstrate improved hydrolytic stability, relative to films manufactured using masterbatch technology with route (2) above. It is believed that the relatively late addition of hydrolysis stabiliser to the polyester in the extrusion process minimises the increase of carboxyl end-groups caused by thermal degradation during film manufacture. In addition, the advantage of route (4) over the masterbatch route, for example, is that it allows greater use of reclaim film (i.e. waste film from the film manufacturing process, for instance, resulting from "edge-trimming" typically performed after the stenter stage in order to provide a film of uniform width). Reclaimed polyester typically has a lower intrinsic viscosity, and a higher concentration of carboxyl end-groups, than virgin polyester chip and the relatively late addition of the hydrolysis stabiliser allows stabilisation of both the virgin and reclaim polyester. The ability to use higher levels of reclaim while providing improved hydrolysis stability is a particular advantage of the present invention.

In one embodiment, the film may further a UV-absorber. The UV-absorber has an extinction coefficient much higher than that of the polyester such that most of the incident UV light is absorbed by the UV-absorber rather than by the polyester. The UV-absorber generally dissipates the absorbed energy as heat, thereby avoiding degradation of the polymer chain, and improving the stability of the polyester to UV light. Typically, the UV-absorber is an organic UV-absorber, and suitable examples include those disclosed in Encyclopaedia of Chemical Technology, Kirk-Othmer, Third Edition, John Wiley & Sons, Volume 23, Pages 615 to 627. Particular examples of UV-absorbers include benzophenones, benzotriazoles (U.S. Pat. No. 4,684,679, U.S. Pat. No. 4,812,498 and U.S. Pat. No. 4,681,905), benzoxazinones (U.S. Pat. No. 4,446,262, U.S. Pat. No. 5,251,064 and U.S. Pat. No. 5,264,539) and triazines (U.S. Pat. No. 3,244,708, U.S. Pat. No. 3,843,371, U.S. Pat. No. 4,619,956, U.S. Pat. No. 5,288,778 and WO 94/05645). The UV-absorber may be incorporated into the film according to one of the methods described herein. In one embodiment, the UV-absorber may be chemically incorporated in the polyester chain. EP-A-0006686, EP-A-0031202, EP-A-0031203 and EP-A-0076582, for example, describe the incorporation of a benzophenone into the polyester. The specific teaching of the aforementioned documents regarding UV-absorbers is incorporated herein by reference. In a particularly preferred embodiment, improved UV-stability in the present invention is provided by triazines, more preferably hydroxyphenyltriazines, and particularly hydroxyphenyltriazine compounds of formula (II):

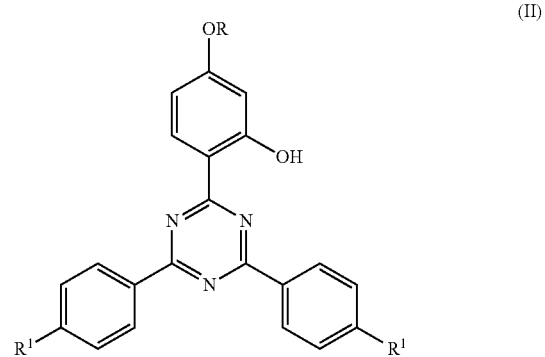

(II)

wherein R is hydrogen, $C_1$-$C_{18}$ alkyl, $C_2$-$C_6$ alkyl substituted by halogen or by $C_1$-$C_{12}$ alkoxy, or is benzyl and $R^1$ is hydrogen or methyl. R is preferably $C_1$-$C_{12}$ alkyl or benzyl, more preferably $C_3$-$C_6$ alkyl, and particularly hexyl. $R^1$ is preferably hydrogen. An especially preferred UV-absorber is 2-(4, 6-diphenyl-1,3,5-triazin-2-yl)-5-(hexyl)oxy-phenol, which is commercially available as Tinuvin™ 1577 FF from Ciba-Additives.

The amount of UV-absorber is preferably in the range from 0.1% to 10%, more preferably 0.2% to 7%, more preferably 0.6% to 4%, particularly 0.8% to 2%, and especially 0.9% to 1.2% by weight, relative to the total weight of the film.

The film preferably also comprises an anti-oxidant. A range of antioxidants may be used, such as antioxidants which work by trapping radicals or by decomposing peroxide. Suitable radical-trapping antioxidants include hindered phenols, secondary aromatic amines and hindered amines, such as Tinuvin™ 770 (Ciba-Geigy). Suitable peroxide-decomposing antioxidants include trivalent phosphorous compounds, such as phosphonites, phosphites (e.g. triphenyl phosphate and trialkylphosphites) and thiosynergists (e.g. esters of thiodipropionic acid, such as dilauryl thiodipropionate). Hindered phenol antioxidants are preferred. A particularly preferred hindered phenol is tetrakis-(methylene 3-(4'-hydroxy-3',5'-di-t-butylphenyl propionate) methane, which is commercially available as Irganox™ 1010 (Ciba-Geigy). Other suitable commercially available hindered phenols include Irganox™ 1035, 1076, 1098 and 1330 (Ciba-Geigy), Santanox™ R (Monsanto), Cyanox™ antioxidants (American Cyanamid) and Goodrite™ antioxidants (BF Goodrich). The concentration of antioxidant present in the polyester film is preferably in the range from 50 ppm to 5000 ppm of the polyester, more preferably in the range from 300 ppm to 1500 ppm, particularly in the range from 400 ppm to 1200 ppm, and especially in the range from 450 ppm to 600 ppm. A mixture of more than one antioxidant may be used, in which case the total concentration thereof is preferably within the aforementioned ranges. Incorporation of the antioxidant into the polyester may be effected by conventional techniques, and preferably by mixing with the monomeric reactants from which the polyester is derived, particularly at the end of the direct esterification or ester exchange reaction, prior to polycondensation.

The film may further comprise any other additive conventionally employed in the manufacture of polyester films. Thus, agents such as cross-linking agents, dyes, fillers, pigments, voiding agents, lubricants, radical scavengers, thermal stabilisers, flame retardants and inhibitors, anti-blocking agents, surface active agents, slip aids, gloss improvers, pro-degradents, viscosity modifiers and dispersion stabilisers may be incorporated as appropriate. Such components may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

The film may, in particular, comprise a particulate filler which can improve handling and windability during manufacture, and can be used to modulate optical properties. The particulate filler may, for example, be a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). Any inorganic filler present should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter±0.8 µm, and particularly ±0.5 µm. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

Formation of the polyester film may be effected by conventional extrusion techniques well-known in the art. In general terms the process comprises the steps of extruding a layer of molten polymer at a temperature within the range of from about 280 to about 300° C., quenching the extrudate and orienting the quenched extrudate. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation. In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the $T_g$ of the polyester, preferably about 15° C. higher than the $T_g$. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the polyester but below the melting temperature thereof, to induce the desired crystallisation of the polyester. During the heat-setting, a small amount of dimensional relaxation may be performed in the transverse direction (TD) by a procedure known as "toe-in". Toe-in can involve dimensional shrinkage of the order 2 to 4% but an analogous dimensional relaxation in the process or machine direction (MD) is difficult to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 180 to 245° C. is generally desirable. In one embodiment, the heat-set-temperature is within the range of from about 200 to about 225° C., which provides unexpected improvements in hydrolytic stability. After heat-setting the film is typically quenched rapidly in order induce the desired crystallinity of the polyester.

In one embodiment, the film may be further stabilized through use of an on-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 to about 2.5 kg/m, and typically in the range of 1.5 to 2 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

The thickness of the polyester film is preferably in the range of from about 5 to about 500 μm, and more preferably no more than about 250 μm, and typically between about 37 μm and 150 μm.

In a preferred embodiment, the film is opaque, and such films are of particular use as the back-plane in a PV-cell. An opaque film preferably exhibits a Transmission Optical Density (TOD) of at least 0.4, preferably at least 0.5, preferably at least 0.6, preferably at least 0.7, preferably at least 1.0 and preferably at least 1.5, and in one embodiment preferably at least 2.0, preferably at least 3.0, and preferably at least 4.0. An opaque film may be pigmented as required, and in one embodiment of the invention, the film of the invention is white, grey or black. Any suitable opacifying agent and/or whitening agent may be used, as is known in the art.

In a preferred embodiment, the film is white, which may be effected by incorporation therein of an effective amount of a whitening agent. Suitable whitening agents include a particulate inorganic filler such as those referred to hereinabove, an incompatible resin filler, or a mixture of two or more such fillers. Preferably the whitening agent is a particulate inorganic filler, preferably titanium dioxide and/or barium sulphate, and in a preferred embodiment the filler is barium sulphate alone. The amount of inorganic filler incorporated into the film is typically in the range of from 5% to 30% by weight, preferably 10% to 25% by weight, based on the weight of polyester in the layer. A white film preferably exhibits a whiteness index, measured as herein described, in the range of from about 80 to about 120 units. A white film typically exhibits a TOD in the range from 0.4 to 1.75, preferably at least 0.5, preferably at least 0.6, preferably at least 0.7.

In an alternative embodiment, the film is grey or black, typically exhibiting a TOD of at least 2.0, more typically at least 3.0, more typically at least 4.0, and this may be achieved by incorporation therein of an effective amount of an opacifying agent, such as carbon black, or a metallic filler such as aluminium powder, as is known in the art. Carbon black is a preferred opacifying agent. Typically, such a film comprises in the range of from about 0.3% to about 10%, preferably 0.5% to 7%, particularly 1% to 5%, and especially 2% to 4% of opacifying agent, by weight based on the weight of the polyester. The opacifying agent suitably has a mean particle diameter in the range from 0.01 to 1.5 μm, particularly 0.02 to 0.05 μm. Such an opaque film may optionally also contain a whitening agent.

In an alternative embodiment, the polyester film is optically clear, preferably having a of scattered visible light (haze) of no more than 15%, preferably no more than 10%, preferably no more than 6%, more preferably no more than 3.5% and particularly no more than 1.5%, and/or a total luminous transmission (TLT) for light in the visible region (400 nm to 700 nm) of at least 80%, preferably at least 85%, more preferably at least about 90%. In this embodiment, any filler in the film is typically present in only small amounts, generally not exceeding 0.5% and preferably less than 0.2% by weight of a layer, and the filler is typically selected from silica and talc, preferably silica. In this embodiment, the windability of the film (i.e. the absence of blocking or sticking when the film is would up into a roll) is improved, without an unacceptable reduction in haze or other optical properties.

The intrinsic viscosity of the polyester film is preferably at least 0.65, preferably at least 0.7, and in one embodiment in the range of from about 0.65 to about 0.75. The use of polyester films with a relatively high intrinsic viscosity provides improved hydrolysis stability.

In one embodiment, the polyester of the polyester film exhibits an endothermic high temperature peak at a temperature of (A)° C. and an endothermic low temperature peak at a temperature of (B)° C., both peaks being measured by differential scanning calorimetry (DSC), wherein the value of (A-B) is in the range from 15° C. to 50° C., preferably in the range from 15° C. to 45° C., more preferably in the range from 15° C. to 40° C., and in one embodiment in the range from 20° C. to 40° C., and this characteristic may be achieved as disclosed herein by control of the heat-setting temperature for the particular polyester being used. The advantage of exhibiting (A-B) values within the ranges disclosed herein is that a surprising improvement in hydrolytic stability is obtained.

The polyester film preferably exhibits a low shrinkage, preferably less than 3% at 150° C. over 30 minutes, preferably less than 2%, preferably less than 1.5%, and preferably less than 1.0%, particularly in the machine (longitudinal dimension) of the film, particularly a biaxially oriented film, and preferably such low shrinkage values are exhibited in both dimensions of the film (i.e. the longitudinal and transverse dimensions).

As well as improved hydrolysis resistance, the polyester films of the present invention exhibit a surprising improvement in film uniformity and quality, relative to the prior art films, particularly those containing hydrolysis stabilisers comprising epoxidised fatty acid glycerides. In particular, the films of the present invention exhibit fewer profile defects and/or die-lines; improved uniformity in thickness and light transmission across the film web; and improved processability, with no defects or breakage in the film web.

In one embodiment, the film described hereinabove may have one or more additional layers disposed on one or both surfaces thereof, to form a composite structure, for instance to provide additional mechanical strength or electrical insulation. Formation of a such a composite structure may be effected by co-extrusion, either by simultaneous coextrusion of the respective film-forming layers through independent orifices of a multi-orifice die, and thereafter uniting the still molten layers or, preferably, by single-channel coextrusion in which molten streams of the respective polymers are first united within a channel leading to a die manifold, and thereafter extruded together from the die orifice under conditions of streamline flow without intermixing thereby to produce a multi-layer film, which may be oriented and heat-set as hereinbefore described. Other methods of forming a multilayer film include the lamination of two or more pre-formed layers, and the coating of a film-forming layer onto one or both surfaces of a base layer. Coating may be effected using any suitable coating technique, including gravure roll coating, reverse roll coating, dip coating, bead coating, extrusion-coating, melt-coating or electrostatic spray coating. Any coating step preferably avoids the use of organic solvent, and is preferably conducted "in-line", i.e. wherein the coating step takes place during film manufacture and before, during or between any stretching operation(s) employed.

Any additional layer is preferably selected from the polyesters derived from the dicarboxylic acids and diols described hereinabove, and preferably from PET or PET-based polyesters. Any additional layer may comprise any of the additives mentioned above, particularly one or more additives independently selected from hydrolysis stabiliser(s), UV-absorber(s), anti-oxidant(s) and particulate inorganic filler(s), wherein the additive(s) in any additional layer may be the same as or different to any such additive in the film of the present invention described hereinabove, and wherein said additive(s) and particularly the hydrolysis stabiliser(s) may be the same as or different to those described hereinabove. The additional layer has a thickness preferably in the range of from about 50 to about 500 µm, more preferably no more than about 250 µm, and typically between about 100 µm and 250 µm, preferably between about 100 µm and 150 µm.

In one embodiment of the present invention, the film described hereinabove has disposed on a first surface thereof an additional polymeric layer, preferably without any further layer on the second surface of said film. In this embodiment, the film of the present invention is preferably an opaque or white film, and the additional polymeric layer is preferably transparent, with a haze of no more than about 50%, typically no more than about 35%, and in one embodiment no more than about 15%. The film according to this embodiment of the present invention is of particular use as a back-plane in a PV cell.

The film of the present invention is intended and adapted for use in any environment in which hydrolytic stability is critical, for instance under humid conditions and elevated temperatures, and in exterior applications, and of particular interest here are photovoltaic (PV) cells. A PV cell is a multilayer assembly typically comprising a front-plane, electrode layers, a photovoltaic-active layer, and a back-plane. Dye-sensitised PV cells are of particular interest, in which the active light-absorbing layer comprises a dye which is excited by absorbing incident light. The film of the present invention is of particular use as, or as a layer present in, the front-plane or the back-plane of the PV cell, particularly the back-plane.

According to a further aspect of the present invention, there is provided a photovoltaic cell comprising front-plane, electrode layers, a photovoltaic-active layer, and a back-plane, wherein the front-plane and/or the back-plane comprises a film of the present invention, and particularly wherein at least the back-plane comprises a film of the present invention.

According to a further aspect of the present invention, there is provided a photovoltaic cell comprising front-plane (which may be a flexible polymeric front-plane or a glass front-plane), electrode layers, a photovoltaic-active layer, and a back-plane, typically wherein the electrode layers and photovoltaic-active layer are encapsulated in an a suitable encapsulant (such as an ethylene vinyl acetate (EVA) resin matrix) as is known in the art, and wherein the back-plane comprises a film of the present invention, preferably wherein said film is an opaque or white film, and preferably wherein said film has disposed on a first surface thereof an additional polymeric layer, preferably without any further layer on the second surface of said film, wherein the additional polymeric layer is preferably transparent having a haze of no more than about 50%, typically no more than about 35%, and in one embodiment no more than about 15%. In such a PV cell, the film of the present invention is outermost in the multi-layer assembly and typically exposed to the atmosphere, and said additional polymeric layer is laminated to the photovoltaic-active layer for instance using a suitable adhesive such as EVA.

According to a further aspect of the present invention, there is provided a process for the manufacture of a biaxially oriented polyester film comprising polyethylene terephthalate as defined herein, wherein the process comprises:

(i) extruding a layer of molten polymer comprising polyethylene terephthalate and a hydrolysis stabiliser selected from a glycidyl ester of a branched monocarboxylic acid, preferably wherein the extrusion temperature is in the range of from about 280 to about 300° C. (more preferably in the range of from about 285 to about 290° C.), wherein the monocarboxylic acid has from 5 to 50 carbon atoms, wherein the hydrolysis stabiliser is present in the extrudate in the form of its reaction product with at least some of the end-groups of said polyester;

(ii) quenching the extrudate;

(iii) stretching the quenched extrudate in two mutually perpendicular directions; and (iv) heat-setting the film, preferably at a temperature in the range of from stabilised by heat-setting at a temperature within the range of from about 200 to about 225° C.

According to a further aspect of the present invention, there is provided the use of a film or composite structure as defined herein as a back-plane in a photovoltaic cell.

Property Measurement

The following analyses were used to characterize the films described herein:

(i) Clarity was evaluated by measuring total luminance transmission (TLT) and haze (% of scattered transmitted visible light) through the total thickness of the film using an M57D spherical hazemeter (Diffusion Systems) according to the standard test method ASTM D1003.

(ii) Transmission Optical Density (TOD) was measured using a Macbeth Densitometer TR 927 (obtained from Dent and Woods Ltd, Basingstoke, UK) in transmission mode.

(iii) Whiteness index was measured using a Colorgard System 2000, Model/45 (manufactured by Pacific Scientific) and the principles of ASTM D 313.

(iv) Intrinsic viscosity (in units of dL/g) was measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln \eta_{rel})/c$$

wherein:
η=the intrinsic viscosity (in dL/g),
$\eta_{rel}$=the relative viscosity,
c=the concentration (in g/dL), &
$\eta_{red}$=reduced viscosity (in dL/g), which is equivalent to $(\eta_{rel}-1)/c$ (also expressed as $\eta r_{sp}/c$ where $\eta_{sp}$ is the specific viscosity).

(v) The hydrolysis resistance of the film was assessed by accelerated aging in an autoclave testing. Samples of the film are cut into strips 10 mm wide and placed in an autoclave operating at 121° C. and 1.2 bar pressure. Properties relating to the aging of the polymer were then measured at various time intervals. In particular, the tensile strength (brittleness) of the polyester was measured as the elongation to break (ETB) of the polymer. An ETB value of over 100% is typically exhibited by a film which has not been aged. In general, a film remains useful in its end-use up to the time at which its ETB is reduced to less than 10%. The preferred films of the present invention exhibit an ETB of at least 10%, after at least 56 hours, preferably at least 60 hours, preferably at least 64 hours, preferably at least 68 hours, preferably at least 76 hours, and more preferably at least 84 hours at 121° C. and 1.2 bar pressure in the accelerated ageing test described herein.

(vi) Elongation to break is measured according to test method ASTM D882. Using a straight edge and a calibrated sample cutter (10 mm+\−0.5 mm) five strips (100 mm in length) of the film are cut along the machine direction. Each sample is tested using an Instron model 3111 materials test machine, using pneumatic action grips with rubber jaw faces. Temperature (23° C.) and relative humidity (50%) are controlled. The crosshead speed (rate of separation) is 25 mm·min$^{-1}$. The strain rate is 50%. It is calculated by dividing the rate of separation by the initial distance between grips (sample length). The equipment records the elongation at break of each sample. The elongation to break ($C_B$ (%)) is defined as:

$$C_B(\%) = (\text{extension at break}/L_0) \times 100$$

where $L_0$ is the original length of the sample between grips.

(vii) The polyester film was tested for weatherability according to ISO 4892-2.

(viii) Thermal shrinkage was assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature of 150° C. (by placing in a heated oven at that temperature) and holding for an interval of 30 minutes, it was cooled to room temperature and its dimensions re-measured manually. The thermal shrinkage was calculated and expressed as a percentage of the original length.

(ix) Differential scanning calorimeter (DSC) scans were obtained using a Perkin Elmer DSC 7 instrument. Polyester film samples weighing 5 mg were encapsulated into a standard Perkin Elmer aluminium DSC crucible. The film and crucible were pressed flat to ensure that the film was partially constrained in order to minimise effects of relaxation of orientation during heating. The specimen was placed in the sample holder of the instrument and heated at 80° C. per minute from 30 to 300° C. to record the relevant trace. A dry, inert purge gas (nitrogen) was used. The temperature and heat flow axis of the DSC instrument were fully calibrated for the experimental conditions, i.e. for the heating rate and gas flow rate. The values for the peak temperatures, i.e. the endothermic high temperature peak (A) and endothermic low temperature peak (B), were taken as the maximum displacement above a baseline drawn from the onset of each endothermic melting process to the end of each endothermic melting process. Peak temperature measurements were derived using standard analysis procedures within the Perkin Elmer software. Precision and accuracy of the measurements was ±2° C. A sample plot is shown in FIG. 1.

The invention is illustrated by reference to FIG. 1, a typical DSC scan (heat flow versus temperature) obtained for a polyester film according to the invention. The peak marked (A) in FIG. 1 is the endothermic high temperature peak having a value of 250° C., and the peak marked (B) is the endothermic low temperature peak having a value of 220° C., and so the value (A−B) is (250−220)=30° C.

The invention is further illustrated by the following examples. The examples are not intended to limit the invention as described above. Modification of detail may be made without departing from the scope of the invention.

EXAMPLES

Controls 1 and 2; Examples 1 to 12

A masterbatch was prepared by metering Cardura™ E10P (Hexion Specialty Chemicals, Ohio, US) as hydrolysis stabiliser onto PET chip (IV of 0.81) containing 18% by weight BaSO$_4$ based on the weight of the polyester. The mixture was then heated, extruded and repelletised. The concentration of hydrolysis stabiliser in the masterbatch was 5.8% by weight, relative to the total weight of the composition. The masterbatch was then added to PET chip (also containing 18% by weight BaSO$_4$) in the hopper of a twin-screw extruder (with vacuum to remove moisture) at pre-determined dilutions in order to provide the final film with hydrolysis stabiliser in varying amounts, as shown in Table 1 below (the amounts shown are % weight hydrolysis stabiliser, relative to the total weight of the film). The mixture was melt extruded at 285° C., cast onto a cooled rotating drum and stretched in the direction of extrusion to approximately 2.9 times its original dimensions at a temperature of 86° C. The cooled stretched film was then passed into a stenter oven at a temperature of 110° C. where the film was dried and stretched in the sideways direction to approximately 3.4 times its original dimensions. The biaxially stretched film was heat-set at a temperature of either 220° C. or 235° C. The final thickness of the resulting white film was 50 μm. The hydrolysis resistance of the film was assessed by measuring its elongation to break before and after accelerated ageing, as defined herein. The amount of hydrolysis stabiliser in the final film was measured by $^1$H NMR (D2-1,1,2,2-tetrachloroethane as solvent; GSX-Delta 400 instrument at 80° C.).

TABLE 1

| | Additive (wt %) | ETB (%) after ageing for x hours | | | | | | | |
|---|---|---|---|---|---|---|---|---|---|
| | | 0 h | 40 h | 44 h | 52 h | 60 h | 64 h | 68 h | 76 h | 84 h |
| (i) heat-set temperature = 220° C. | | | | | | | | | |
| Control 1 | 0 | 123 | 64 | 43 | 28 | 8 | 6 | 3 | 2 | 1 |
| Example 1 | 0.455 | 120 | 93 | 71 | 51 | 20 | 8 | 6 | 3 | 2 |
| Example 3 | 0.741 | 124 | 94 | 82 | 61 | 22 | 17 | 7 | 3 | 3 |
| Example 5 | 0.923 | 119 | 85 | 89 | 59 | 32 | 31 | 27 | 5 | 3 |
| Example 7 | 1.04 | 119 | 105 | 99 | 83 | 80 | 65 | 49 | 7 | 5 |
| Example 9 | 1.105 | 115 | 119 | 83 | 88 | 65 | 55 | 51 | 18 | 6 |
| Example 11 | 1.261 | 101 | 94 | 87 | 71 | 55 | 43 | 34 | 11 | 6 |
| (ii) heat-set temperature = 235° C. | | | | | | | | | |
| Control 2 | 0 | 137 | 38 | 15 | 5 | 3 | 2 | 1 | 2 | 1 |
| Example 2 | 0.455 | 141 | 66 | 46 | 15 | 4 | 3 | 5 | 1 | 1 |
| Example 4 | 0.741 | 126 | 80 | 69 | 28 | 6 | 5 | 3 | 1 | 1 |
| Example 6 | 0.923 | 132 | 91 | 75 | 44 | 13 | 7 | 4 | 2 | 2 |
| Example 8 | 1.04 | 126 | 111 | 92 | 86 | 31 | 28 | 12 | 3 | 2 |
| Example 10 | 1.105 | 127 | 105 | 93 | 91 | 59 | 42 | 7 | 4 | 2 |
| Example 12 | 1.261 | 121 | 68 | 70 | 50 | 23 | 11 | 7 | 3 | 2 |

The results demonstrate that the Cardura™ E10P additive clearly improves the hydrolysis resistance of the film in the accelerated ageing test. The results also demonstrate that relatively lower heat-set temperatures provide surprisingly superior long-term hydrolytic stability.

Controls 3 to 8 and Examples 13 to 22

A second set of polyester films was prepared except that the Cardura™ E10P additive was added by metering it onto PET chip (containing 18% of BaSO$_4$ as above) in the hopper on the film line extruder. The mixture of PET chip and additive was then filmed as described above for Example 1. Controls 3 to 8 and Examples 13 to 22 were produced by varying the IV of the PET (higher IV polymer was obtained via conventional solid-state polymerisation); the heat-set temperature; and the amount of the hydrolysis stabiliser additive, as shown in Table 2 below. Examples 15 and 21 contained a UV absorber (Tinuvin™ 1577FF (2-(4,6-diphenyl-1,3,5-triazin-2-yl-)-5-((hexyl)oxyl-phenol); Ciba Specialty Chemicals) at 1.0% by weight relative to the total weight of the final film. The final thickness of the white film in each case was 50 µm. The hydrolysis resistance of the film was assessed by measuring its elongation to break before and after accelerated ageing, as defined herein. The amount of hydrolysis stabiliser in the final film was measured by $^1$H NMR, as described above.

The results in Table 2 below demonstrate that the hydrolysis stabiliser remains effective when mixed with the polyester in the hopper of the film extruder. The results also demonstrate that hydrolytic stability is improved with increasing IV of the polyester.

TABLE 2

| | | Additive | ETB (%) after ageing for x hours | | | | | | | | | | | | | |
|---|---|---|---|---|---|---|---|---|---|---|---|---|---|---|---|---|
| | IV | (wt %) | 0 | 40 | 44 | 48 | 52 | 56 | 60 | 64 | 68 | 72 | 76 | 80 | 84 | 88 |
| (i) heat-set temperature = 220° C. | | | | | | | | | | | | | | | | |
| Ctrl. 3 | 0.64 | 0 | 127 | 22 | 11 | 8 | 8 | 4 | 2 | 2 | 2 | 2 | 4 | 0 | 0 | — |
| Ctrl. 4 | 0.81 | 0 | 154 | 37 | 15 | 16 | 8 | 4 | 3 | 2 | 2 | 2 | 2 | 0 | 0 | — |
| Ctrl. 5 | 0.85 | 0 | 132 | 41 | 25 | 20 | 15 | 4 | 4 | 3 | 2 | 2 | 1 | 3 | 1 | 1 |
| Ex. 13 | 0.64 | 1.0 | 134 | 87 | 81 | 68 | 56 | 18 | 6 | 5 | 2 | 2 | 2 | 2 | 0 | — |
| Ex. 14 | 0.81 | 1.0 | 148 | 126 | 131 | 124 | 122 | 107 | 94 | 84 | 58 | 35 | 30 | 13 | 7 | 4 |
| Ex. 15$^a$ | 0.81 | 1.0 | 148 | 126 | 124 | 131 | 133 | 115 | 110 | 105 | 61 | 32 | 19 | 19 | 4 | 3 |
| Ex. 16 | 0.85 | 0.3 | 135 | 99 | 85 | 68 | 52 | 38 | 12 | 6 | 5 | 2 | 2 | 2 | 1 | 2 |
| Ex. 17 | 0.85 | 0.5 | 138 | 98 | 99 | 89 | 80 | 67 | 44 | 27 | 15 | 10 | 8 | 2 | 6 | 2 |
| Ex. 18 | 0.85 | 1.0 | 125 | 115 | 120 | 109 | 112 | 108 | 104 | 84 | 79 | 71 | 71 | 19 | 18 | 8 |
| (ii) heat-set temperature = 235° C. | | | | | | | | | | | | | | | | |
| Ctrl. 6 | 0.64 | 0 | 141 | 3 | 3 | 3 | 2 | 1 | 2 | 2 | 1 | 1 | 0 | 0 | 0 | — |
| Ctrl. 7 | 0.81 | 0 | 132 | 7 | 5 | 4 | 3 | 2 | 3 | 2 | 1 | 2 | 3 | 0 | 0 | — |
| Ctrl. 8 | 0.85 | 0 | 128 | 8 | 4 | 4 | 3 | 1 | 1 | 2 | 1 | 2 | 1 | 1 | 0 | — |
| Ex. 19 | 0.64 | 1.0 | 138 | 38 | 19 | 12 | 5 | 4 | 2 | 3 | 2 | 2 | 3 | 0 | 0 | — |
| Ex. 20 | 0.81 | 1.0 | 134 | 94 | 88 | 91 | 79 | 50 | 50 | 18 | 18 | 5 | 3 | 3 | 2 | — |
| Ex. 21$^a$ | 0.81 | 1.0 | 171 | 119 | 113 | 117 | 67 | 34 | 25 | 13 | 5 | 3 | 2 | 2 | 1 | 2 |
| Ex. 22 | 0.85 | 1.0 | 131 | 93 | 93 | 79 | 84 | 72 | 79 | 48 | 17 | 6 | 5 | 5 | 4 | 3 |

$^a$contains Tinuvin ™ 1577FF at 1.0% by weight

Control 9 and Examples 23 to 27

A third set of polyester films were prepared except that the Cardura™ E10P additive was added by metering it directly into the polyester melt stream in the film line extruder, i.e. once the polyester was in the molten state. The mixture of PET chip (18% BaSO$_4$; IV=0.81) and additive was then filmed as described above for Example 1. Control 9 and Examples 23 to 27 were produced by varying the addition rate of the additive into the extruder, as shown in Table 3 below. The final film thickness in each case was 50 μm. The hydrolysis resistance of the film was assessed by measuring its elongation to break before and after accelerated ageing, as defined herein. The amount of hydrolysis stabiliser in the final film was measured by NMR, as before.

The results in Table 3 below demonstrate that the hydrolysis stabiliser remains effective when added to the molten polyester within the film extruder. This method of manufacture is particularly attractive since it minimises or avoids removal of the additive by the vacuum system of the extruder. The results also demonstrate that there is an optimum level of additive above which a deterioration in properties is seen.

In all of the Examples according to the invention described above, the film uniformity and film quality was excellent, with a very low level of die-lines or profile defects; there was no odour detected around the film die; and all films demonstrated good processability.

TABLE 3

| | Addition rate of additive (cc/hour) | Additive in film (wt %) | ETB (%) after ageing for x hours | | | | | | | | | | | | | | | | |
|---|---|---|---|---|---|---|---|---|---|---|---|---|---|---|---|---|---|---|---|
| | | | 0 | 40 | 44 | 48 | 52 | 56 | 60 | 64 | 68 | 72 | 76 | 80 | 84 | 88 | 92 | 96 | 100 |
| Ctrl. 9 | 0 | 0 | 138 | 43 | 18 | 9 | 6 | 5 | 5 | 3 | 0 | 0 | 0 | 0 | 0 | 0 | 0 | 0 | 0 |
| Ex. 23 | 700 | — | 146 | 128 | 112 | 105 | 79 | 84 | 66 | 45 | 33 | 27 | 18 | 16 | 6 | 3 | 0 | 0 | 0 |
| Ex. 24 | 960 | 1.43 | 138 | 128 | 128 | 121 | 123 | 119 | 108 | 98 | 96 | 105 | 83 | 69 | 40 | 24 | 11 | 15 | 7 |
| Ex. 25 | 1230 | 1.69 | 129 | 105 | 93 | 104 | 99 | 83 | 100 | 85 | 78 | 76 | 77 | 42 | 31 | 25 | 15 | 7 | 4 |
| Ex. 26 | 1596 | 1.95 | 135 | 119 | 106 | 80 | 89 | 86 | 66 | 51 | 46 | 50 | 38 | 19 | 11 | 4 | 4 | 3 | 2 |
| Ex. 27 | 2220 | 2.86 | 144 | 4 | 4 | 3 | 4 | 3 | 3 | 0 | 0 | 0 | 0 | 0 | 0 | 0 | 0 | 0 | 0 |

Example 28 and Comparative Example 1

A set of two films was made under identical conditions according to the process route described in Examples 13 to 22 (i.e. in which the hydrolysis stabiliser was metered onto the PET chip in the hopper on the film line extruder) in order to make a side-by-side comparison of the hydrolytic stability of the films of the present invention against the prior art films. Thus, Example 28 was a film comprising Cardura™ E10P, and Comparative Example 1 was a film comprising an hydrolysis stabiliser disclosed in U.S. Pat. No. 7,229,697, namely epoxidised soybean oil (Edenol® 81). In each case, the PET chip had an IV of 0.81 and contained 18% BaSO$_4$, and the concentration of additive in the final film was 1.0 wt % as measured by NMR. The hydrolysis stability of each film was measured in the accelerated ageing test described herein, and Example 28 demonstrated unexpectedly superior hydrolysis stability. Thus, the ETB of Example 28 reduced to less than 10% between 96 and 100 hours whereas the ETB of Comparative Example 1 reduced to less than 10% between 72 and 76 hours. In addition, the film of Example 28 was a good quality film, with good uniformity and no noticeable profile defects, whereas Comparative Example 1 was a poor quality film, exhibiting poor film uniformity, with die-lines and significant profile defects.

Comparative Example 2

Comparative Example 1 was repeated using epoxidised linseed oil (Edenol® B316) as a hydrolysis stabiliser sufficient to provide 0.5 mol % of the additive in the final film. However, the additive caused severe problems in the molten extrudate; the melt at the die was relatively soft, and it was impossible to make film because of sticking and poor formation and retention of the film web.

The invention claimed is:

1. A process for the manufacture of a biaxially oriented polyester film, wherein the process comprises:
   (i) extruding a layer of molten polymer comprising polyethylene terephthalate and at least one hydrolysis stabiliser that is a glycidyl ester of a branched monocarboxylic acid, wherein said glycidyl ester of a branched monocarboxylic acid is in the absence of other hydrolysis stabilizers, and wherein the monocarboxylic acid has from 5 to 50 carbon atoms, wherein said hydrolysis stabiliser is present in the extrudate in the form of its reaction product with at least some of the end-groups of said polyester;
   (ii) quenching the extrudate;
   (iii) stretching the quenched extrudate in two mutually perpendicular directions; and
   (iv) heat-setting the film at a temperature within the range of from about 200 to about 225° C.;
   (v) wherein the hydrolysis stabiliser is introduced during the film-making process by injecting the hydrolysis stabiliser into the molten polymer within the extruder.

2. The process according to claim 1 wherein the process comprises the further step of manufacturing said hydrolysis stabiliser by the reaction of epichlorohydrin with said branched monocarboxylic acid.

3. The process according to claim 1 wherein the polyester film contains no glycidyl ether and no catalyst.

4. The process according to claim 1 wherein the polyester film exhibits an elongation to break, measured according to ASTM D882, of at least 10% after at least 56 hours when aged at 121° C. and 1.2 bar pressure.

5. The process according to claim 1, wherein the extruder is a twin screw extruder and the hydrolysis stabiliser is injected into the molten polymer within the extruder after the polymer has passed through any devolatilisation zone.

6. The process according to claim 1, wherein the intrinsic viscosity of the polyester in the polyester film is at least about 0.65 dL/g.

7. The process according to claim 1, wherein the hydrolysis stabiliser is present in an amount in the range from 0.1% to 2.0%, relative to the total weight of the polyester film.

8. The process according to claim 1, wherein said branched monocarboxylic acid has from 5 to 15 carbon atoms, and/or wherein said branched monocarboxylic acid is saturated, and/or said branched monocarboxylic acid is a synthetic material.

9. The process according to claim 1, wherein said hydrolysis stabiliser has formula (I):

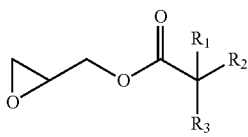

(I)

wherein:
R¹ and R² are independently selected from alkyl;
R³ is selected from hydrogen and alkyl; and
wherein the total number of carbon atoms in the alkyl groups R¹, R² and R³ is from 3 to 48.

10. The process according to claim 8, wherein R¹ is methyl and R² and R³ are independently selected from alkyl, wherein the total number of carbon atoms in the alkyl groups R² and R³ is 7.

11. The process according to claim 1, wherein the polyester film further comprises a UV-absorber.

12. The process according to claim 11, wherein the amount of UV-absorber is in the range from 0.1% to 10% by weight, relative to the total weight of the layer.

13. The process according to claim 1, wherein the polyester of the polyester film exhibits an endothermic high temperature peak at a temperature of (A)° C. and an endothermic low temperature peak at a temperature of (B)° C., both peaks being measured by differential scanning calorimetry (DSC), wherein the value of (A–B) is in the range from 15° C. to 50° C.

14. The process according to claim 1, wherein the polyester film exhibits an elongation to break, measured according to ASTM D882, of at least 10% after at least 60 hours when aged at 121° C. and 1.2 bar pressure.

15. The process according to claim 1, wherein the polyester film is white.

16. The process according to claim 1, wherein the polyester film further comprises an anti-oxidant.

17. The process according to claim 1, wherein the polyester film has disposed on a first surface thereof an additional polymeric layer, wherein said additional polymeric layer is a polyester layer optionally comprising one or more additives independently selected from hydrolysis stabiliser(s), UV-absorber(s), anti-oxidant(s) and particulate inorganic filler(s).

18. The process according to claim 1, wherein the polyester film is present as a layer in a photovoltaic cell comprising a front-plane, electrode layer(s), a photovoltaic-active layer, and a back-plane.

19. A process for the manufacture of a photovoltaic cell comprising a front-plane, electrode layer(s), a photovoltaic-active layer, and a back-plane, wherein the front-plane and/or the back-plane comprises a biaxially oriented polyester film, said process comprising the step of manufacturing a biaxially oriented polyester film, wherein the process comprises:
(i) extruding a layer of molten polyester comprising polyethylene terephthalate and at least one hydrolysis stabiliser that is a glycidyl ester of a branched monocarboxylic acid, wherein said glycidyl ester of a branched monocarboxylic acid is in the absence of other hydrolysis stabilizers, and wherein the monocarboxylic acid has from 5 to 50 carbon atoms, wherein said hydrolysis stabiliser is present in the extrudate in the form of its reaction product with at least some of the end-groups of said polyester;
(ii) quenching the extrudate;
(iii) stretching the quenched extrudate in two mutually perpendicular directions; and
(iv) heat-setting the film at a temperature within the range of from about 200° C. to about 225° C.,
wherein the hydrolysis stabiliser is introduced during the film-making process by injecting the hydrolysis stabiliser into the molten polymer within the extruder, and further comprising disposing said biaxially oriented polyester film in the photovoltaic cell such that the front-place and/or back-plane comprises said biaxially oriented polyester film.

20. The process according to claim 19, wherein said electrode layers and photovoltaic active layer are encapsulated in a suitable encapsulant, and wherein the back-plane comprises said biaxially oriented polyester film.

21. The process according to claim 20, wherein said polyester film is an opaque or white film, wherein said biaxially oriented polyester film has disposed on a first surface thereof an additional polymeric layer, wherein said additional layer exhibits a haze of no more than about 50%.

22. The process according to claim 19, wherein the photovoltaic cell is a multi-layer assembly comprising said front-plane, electrode layer(s), photovoltaic-active layer, and back-plane, and wherein said biaxially oriented polyester film is outermost in the multi-layer assembly.

* * * * *